United States Patent [19]

Satler

[11] 4,251,174
[45] Feb. 17, 1981

[54] ROLLER HOLD DOWN

[75] Inventor: Walter I. Satler, Huntington Beach, Calif.

[73] Assignee: McDonnell Douglas Corporation, Long Beach, Calif.

[21] Appl. No.: 15,958

[22] Filed: Feb. 28, 1979

[51] Int. Cl.³ .......................... B23C 1/06; B23C 1/13; B23Q 3/06
[52] U.S. Cl. .................. 409/137; 144/134 A; 408/95; 409/138; 409/141; 409/178; 409/191; 409/903
[58] Field of Search ............... 409/137, 138, 141, 175, 409/178, 180, 190, 191, 226, 227, 235, 903; 408/95, 98, 112; 144/134 R, 134 A, 134 B, 134 C, 136 R, 252 R; 269/134, 135, 289 MR

[56] References Cited
U.S. PATENT DOCUMENTS

| 2,379,182 | 6/1945 | Porter et al. | 408/112 |
| 3,418,883 | 12/1968 | Leibow | 409/138 |
| 3,587,391 | 6/1971 | Pitts et al. | 409/235 |
| 3,877,833 | 4/1975 | Thornton et al. | 408/112 X |
| 4,158,987 | 6/1979 | Smith | 409/190 X |

Primary Examiner—Z. R. Bilinsky
Attorney, Agent, or Firm—John P. Scholl; Walter J. Jason; Donald L. Royer

[57] ABSTRACT

A roller hold down is designed to restrain parts being cut from a stack of flat sheets. The roller hold down eliminates the need for secondary fastening means to restrain the parts during the cutting operation. The parts are restrained in position on a flat worktable by a pair of cylindrical rollers adjacent the cutter which force the parts against the table. By use of the roller hold down, the restraining force applied through the rollers follows the excursions of the cutter and is applied near the cutter where the force is the most effective.

10 Claims, 4 Drawing Figures

ROLLER HOLD DOWN

BACKGROUND OF THE INVENTION

Aerospace companies as well as other sheet metal manufacturing companies use parts cut from flat metal sheets. For reasons of economy, a stack of flat metal sheets are profiled, milled or routed in a single operation. To prevent damage to the parts being cut from the stack of metal sheets, the parts must be anchored in position on a worktable. In the past, the parts have been fastened to the worktable or bed of the cutting machine by clamps, adhesive, fasteners of various types, as well as being fastened to the parent sheet of material by small interconnecting tabs. All of these restraining means have their drawbacks due to the need for a secondary operation to free up the individual parts following the cutting operation.

SUMMARY OF THE INVENTION

One of the principal purposes of the inventive roller hold down is to hold flat parts in position on a worktable during the cutting operation to prevent damage to parts and eliminate the need for secondary operation to free up the parts upon completion of the cutting operation.

The roller hold down anchors the cut parts in position on the worktable by applying a force in a first or Z direction perpendicular to the plane of the worktable thrusting the parts against the worktable.

The restraining force is applied to the parts by two parallel cylindrical rollers that are adjacent to and on opposite sides of the cutter. The rollers are attached to guides that straddle the worktable or bed of the machine and guide the rollers in a second direction along an X-axis perpendicular to said Z direction. The rollers move along the X-axis in a plane parallel to the plane of the worktable.

A set of force transmitting bearings contact the side of the cylindrical rollers opposite the side that is contacting the parts. These force transmitting bearings transmit a force to the rollers in the Z direction. The force transmitting bearings move along the rollers in a Y-axis which is parallel to the plane of the worktable and perpendicular to the X-axis.

Extensible means in the form of pneumatic or hydraulic actuators are attached to the force transmitting bearings and provide the Z directional force. The extensible means is attached to the head of the machine which includes the cutter and therefore can follow the excursions of the cutter along the X or Y-axis in the plane of the worktable.

In some machines the head and cutter move, and the worktable of the machine is stationary. In other machines the worktable is movable and the head and cutter are stationary. In either instance, the restraining force is applied adjacent to the cutter and thrusts the parts against the worktable of the machine, anchoring them in position on the worktable during the cutting operation.

The roller hold down may incorporate a vacuum chamber surrounding the cutter for removing chips formed during the cutting operation. The chips are conveyed by the vacuum through a duct to a waste bin. The immediate removal of the chips prevents them from encountering the rollers or force transmitting bearings and hindering or disrupting the operation of the machine.

DETAILED DESCRIPTION OF PREFERRED EMBODIMENT

Figure 1:
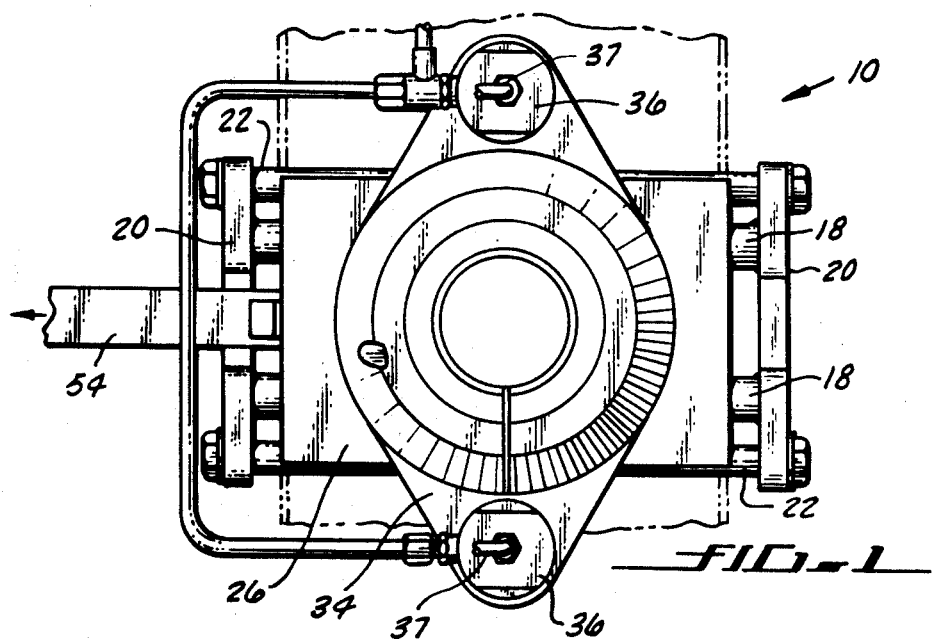
FIG. 1 is a plan view of the preferred embodiment of the inventive roller hold down.
Figure 2:
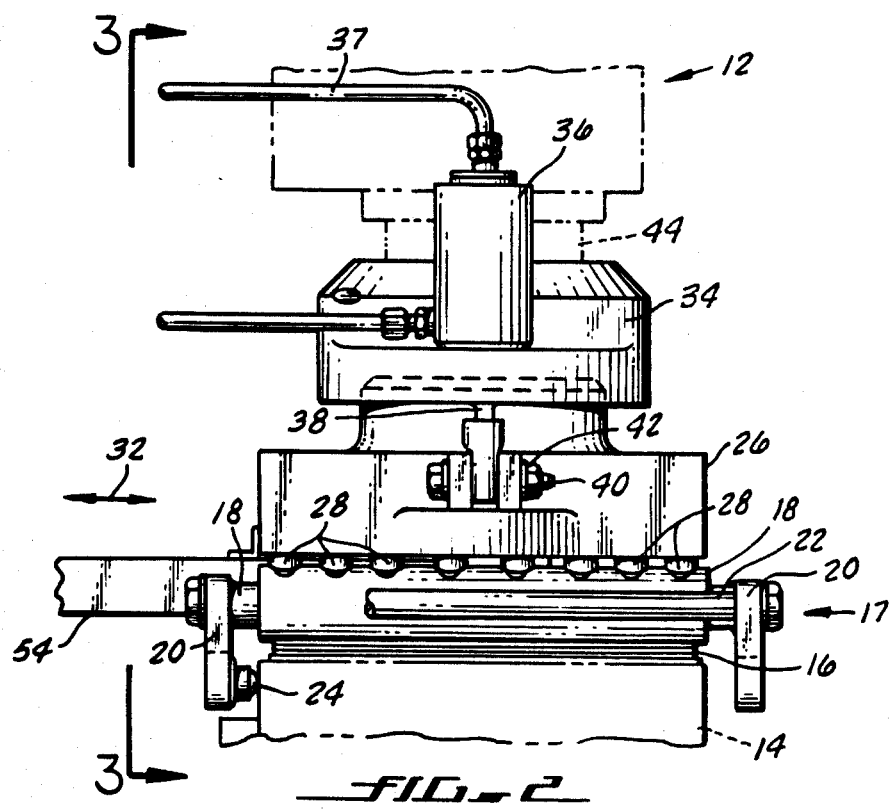
FIG. 2 is a side elevation of the roller hold down attached to the head of a Gorton Profile Mill, e.g., a profiling machine (in phantom line)

FIG. 1 is a plan view of the inventive roller hold down 10. In FIG. 2, the roller hold down has been attached to Gorton Profile Mill, 12, a profiling machine (in phantom line).

In FIG. 2 a portion of the movable worktable 14 of the profiling machine is depicted. A stack of metal sheets 16 have been placed against the worktable 14. Carriage section 17 embodying force transmitting rollers 18 is placed against the stack of sheets 16. The force transmitting cylindrical rollers 18 transmit the restraining force to the sheets 16 in a first or Z direction perpendicular to the plane of the worktable 14 and press the sheets 16 against the worktable 14.

Figure 3:
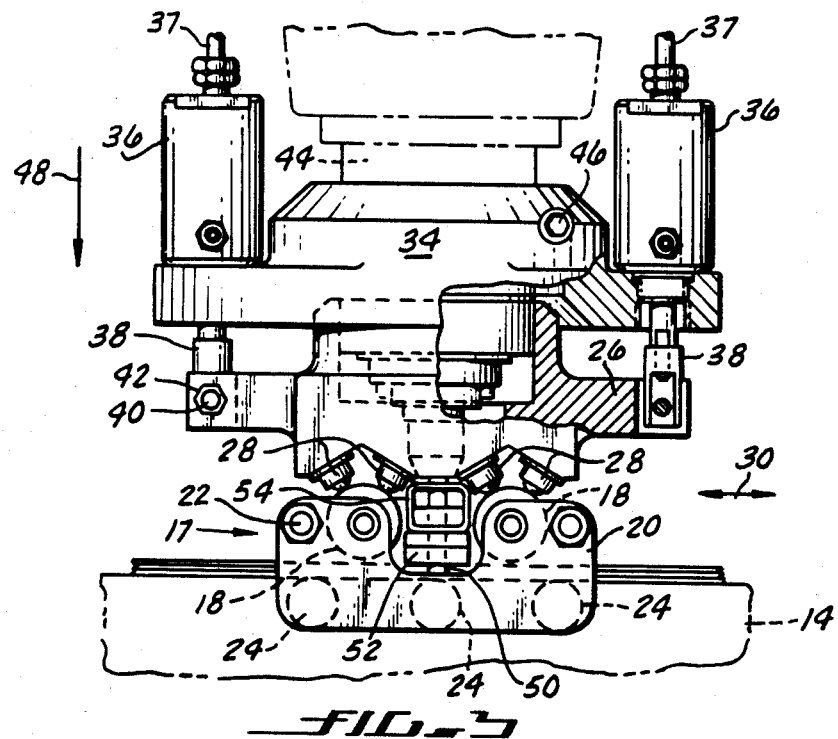
FIG. 3 is a front elevation view along the lines 3—3 of FIG. 2.

The carriage section 17 includes roller guide means comprising end frames 20 attached to rollers 18. The end frames are held together by connecting rods 22. Three caster bearings 24 are attached to end frame 20. One of these caster bearings 24 is shown in FIG. 2 in engagement with worktable 14 guiding the carriage section. The locations of the three caster bearings 24 on end frame 20 are shown in FIG. 3. Three similar caster bearings are attached to the opposing end frame. When the six caster bearings engage the opposite sides of worktable 14, the rollers are positioned straddling the sheets 16 and worktable 14 and the roller guide means limits the travel of the rollers to second direction along an X-axis in a plane parallel to the worktable as shown by double-ended arrow 30 in FIG. 3.

A body member 26 has four rows 28 of caster bearings as seen from the end view in FIG. 3. One row of these bearings 28 is shown in a side view in FIG. 2.

The four rows 28 of bearings are divided into two sets. Each set of bearings obliquely engages one cylindrical roller 18 on the side opposite the side that has engaged the stack of sheets 16. The combined force components of two rows 28 of bearings results in a restraining force in a Z direction perpendicular to the plane of the worktable 14 of the machine. The force transmitting bearings and body member 26 may traverse the roller 18 in a third direction, along a Y-axis parallel to the plane of the worktable 14, as shown by the double-ended arrow 32 of FIG. 2. The Y-axis is orientated 90° to the X-axis.

On top of body member 26 is the attachment member 34. Attachment member 34 incorporates two extensible pneumatic actuators 36. The pistons (not shown) in these actuators 36 are attached to connecting rods 38. The rods 38 are in turn coupled to body member 26 by bolts 40 and nuts 42.

The attachment member 34 surrounds and is fastened to head 44 of the milling machine by set screw 46 (FIG. 3).

By directing air to the top of the actuators 36 through lines 37, the pistons inside of the actuators are forced in the Z direction of arrow 48 of FIG. 3. Rods 38, attached to the pistons, transmit this Z directional force to the body member 26. The body member 26 transmits the downward force through its rows 28 of caster bearings to the rollers 18. The rollers 18 in turn thrust the sheets 16 against the worktable 14 of the profiling machine 12.

A cutter 50 is located in the head 44 of the profiling machine. The rollers 18 (FIGS. 3 and 4) are adjacent to and on opposite sides of the cutter 50. Directly surrounding cutter 50 is a vacuum chamber 52 to collect the chips removed during the cutting operation. The vacuum duct 54 conveys chips from the vacuum chamber 52 to refuge bin (not shown).

In operation, a stack of flat sheets 16 are placed on the worktable 14. The carriage section 17 is placed against the sheets 16. Air is directed through tube 37 to the top of pistons in actuators 36, and body member 26 is then moved in the Z direction of arrow 48 in FIG. 3 to contact rollers 18 in the carriage section. As the air pressure in line 37 is increased, the body member 26 is forced in a Z direction away from attachment member 34. With the increase in pressure in the actuators 36, the rows 28 of caster bearings are forced against rollers 18 and the rollers in turn apply greater pressure on the sheets 16 adjacent the cutter 50 and hold the sheets in position by thrusting them against the worktable 14. The rollers 18 being directly adjacent the cutter 50 engage and hold even small parts against the worktable 14.

When the profile mill is turned on to cut the stacks of sheets 16, a vacuum is applied to duct 54 which in turn draws any cuttings which may be formed into the vacuum chamber 52 and into the duct 54 for removal.

The worktable 14 of the milling machine 12 can be moved in a plane parallel to the surface of the worktable 14 along the X or Y-axis to cut out stacks of parts. The roller hold down 10 places the restraining force on the parts at the optimum location directly adjacent the cutter 50 and prevents the parts from moving on the worktable 14 as they are cut from the parent metal sheets 16. The rollers 18 permit the application of force in a Z direction while the worktable 14 is moving along the X-axis of arrow 32 in FIG. 3. The rows 28 of caster bearings permit the application of a force in a Z direction while the worktable 14 moves along the Y-axis of arrow 30 in FIG. 2.

Due to the interaction of the roller 18 and the rows 28 of caster bearings, the restraining force may be applied to the sheets 16 at the optimum location directly adjacent the the cutter 50. This restraining force may be continuously applied while the cutter and rollers 18 move along the X-axis parallel to the plane of the worktable since the rolling friction between the rollers and the stack of flat sheets is less than the sliding friction between the various sheets in stack 16 and the sliding friction between the bottom sheet and the worktable 14.

The friction between the rows 28 of caster bearings as they move along rollers 18 is likewise less than the sliding friction between the sheets of the stack 16 and between the bottom sheet and the worktable 14. For this reason the parts are held in position on the worktable 14 while cutter 50 and body member 26 move along the Y-axis.

When the parts have been cut from the parent sheets 16, the flow of air is reversed in tube 37 and pistons in actuator 36 move in a direction opposite of the Z direction and disengaged body member 26 from rollers 18. The carriage section 17 may then be removed from the worktable freeing up the cut parts. The cut parts may also be removed by merely moving the carriage section along the X-axis so that the rollers 18 no longer contact the cut parts.

Figure 4:
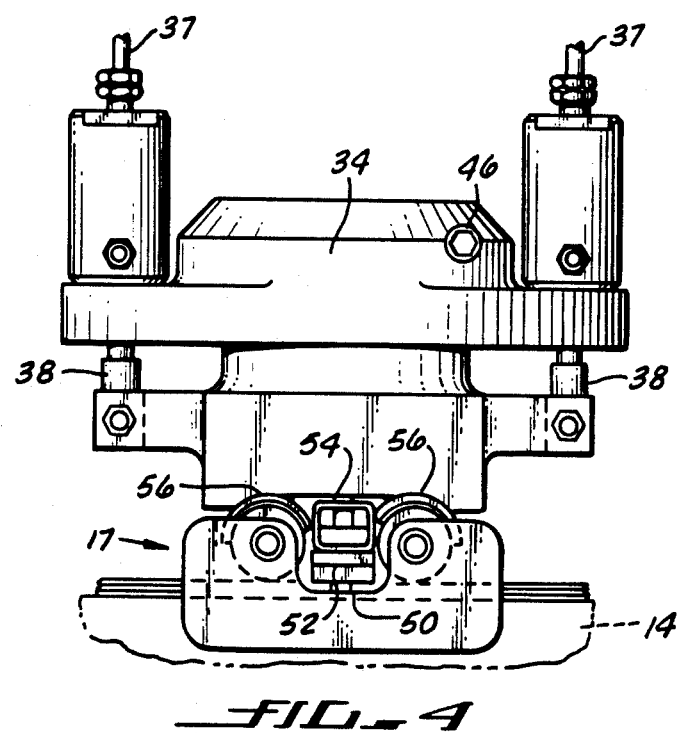
FIG. 4 is a front elevation view of ann alternative configured roller hold down wherein journal bearings have been substituted for the force transmitting caster bearings of FIG. 3.

In an alternative embodiment shown in FIG. 4, journal bearings 56 have been substituted for rows 28 of caster bearings in FIGS. 1, 2 and 3. The journal bearings permit the application of a force in a Z direction of arrow 48 of FIG. 3 while the body member 27 is moving along the Y-axis of arrow 30 of FIG. 2. The sliding friction between the journal bearings 56 and the roller 18 is less than the sliding friction between the stack of sheets 16 and the sliding friction between the bottom sheet and the worktable 14.

Hydraulic fluid may be substituted for the air in lines 37 and the actuators 36 to move the pistons.

While certain exemplary embodiments of this invention have been described above and shown in the accompanying drawings, it is to be understood that such embodiments are merely illustrative of, and not restrictive on, the broad invention and that I do not desire to be limited in my invention to the specific constructions or arrangements shown and described, since various other obvious modifications may occur to persons having ordinary skill in the art.

What is claimed is:

1. A restraining mechanism, for use on a machine having a flat base section and a head section which move with respect to each other in a plane parallel to the plane of said flat base section, said mechanism being capable of transmitting a restraining force in a Z direction perpendicular to the plane of said flat base section, to hold a flat part location between said head section and said base section against said flat base section while said base section and said head section move with respect to each other comprising:

cylindrical roller means to contact said flat part located on said flat base section and maintain rolling contact with said part while moving along an X axis perpendicular to said Z direction and parallel to the plane of the flat base section;

bearing means, to contact said roller on the side opposite said part to be held, to transmit the restraining force to said roller, said bearing means being in contact with said rollers while moving along a Y-axis perpendicular to said X-axis and parallel to the plane of said base section;

extensible means attached to said bearing means to apply said Z directional restraining force to said bearing means; and attachment means interconnecting said extensible means to said head section of said machine.

2. The restraining mechanism of claim 1 wherein said rroller means comprises two parallel rollers which contact said part.

3. The restraining mechanism of claim 2 wherein said bearing means are caster bearings that contact said rollers on the side of the rollers opposite the part to be restrained.

4. The restraining mechanism of claim 2 wherein said bearing means are journal bearings that contact said rollers on the side of the roller opposite the part to be restrained.

5. The restraining mechanism of claims 3 or 4 wherein said extensible means comprises a fluid-activated piston and cylinder.

6. A restraining device for use on a machine with a head and a flat base, said head and said base moving with respect to each other in a plane parallel to said flat base, said head containing a cutter, said device to transmit a restraining force in a Z direction from said head toward said base to hold a flat part against said base during a cutting operation comprising:
- two parallel cylindrical rollers located on opposite sides of said cutter to contact said part and maintain rolling engagement with said part on said base while moving along an X-axis in a plane parallel to said flat base and perpendicular to said Z direction;
- bearing means to engage said rollers on the side of the rollers opposite said part to transmit said restraining force to the rollers while moving along a Y-axis in engagement with said rollers in a plane parallel to said flat base and perpendicular to said X direction;
- extensible means attached to said bearing means to apply said Z directional restraining force to said bearing means; and
- attachment means interconnecting said extensible means to said head of said machine.

7. The device of claim 6 wherein said bearing means comprises caster bearings for engagement with said rollers.

8. The device of claim 6 wherein said bearing means comprises journal bearings for engagement with said rollers.

9. The device of claims 7 or 8 wherein said extensible means comprises cylinder and piston means.

10. The device of claims 7 or 8 wherein vacuum means is provided surrounding the cutter for removing chips formed in the cutting operation.

* * * * *